United States Patent [19]

O'Connor et al.

[11] Patent Number: 4,883,552
[45] Date of Patent: Nov. 28, 1989

[54] PULTRUSION PROCESS AND APPARATUS

[75] Inventors: James E. O'Connor; William H. Beever; Jeffrey W. Dancer; William B. Beaulieu; Larry M. Selby; Virgil H. Rhodes, Jr., all of Bartlesville, Okla.

[73] Assignee: Phillips Petroleum Company, Bartlesville, Okla.

[21] Appl. No.: 938,689

[22] Filed: Dec. 6, 1986

[51] Int. Cl.⁴ .................................... D04H 3/08
[52] U.S. Cl. ................................ 156/180; 156/181; 156/441; 264/103; 264/281
[58] Field of Search .............. 156/166, 180, 181, 242, 156/245, 441; 264/46.2, 46.3, 103, 281, DIG. 26

[56] References Cited

U.S. PATENT DOCUMENTS

| 2,684,318 | 7/1954 | Meek | 154/91 |
|---|---|---|---|
| 2,693,922 | 11/1954 | Ellison | 244/123 |
| 2,938,566 | 5/1960 | Toulmin, Jr. | 264/103 |
| 3,217,734 | 11/1965 | Fitzgerald | 264/DIG. 26 |
| 3,498,572 | 3/1970 | Lumn | 244/1 |
| 3,556,888 | 1/1971 | Goldsworthy | 156/73 |
| 3,674,585 | 7/1972 | Windecker | 156/182 |
| 3,819,795 | 6/1974 | Martin et al. | 264/248 |
| 3,873,399 | 3/1975 | Goldsworthy | 264/281 |
| 4,132,823 | 1/1979 | Blackwell et al. | 428/215 |
| 4,186,044 | 1/1980 | Bradley et al. | 156/273 |
| 4,207,129 | 6/1980 | Tadewald | 156/242 |
| 4,292,105 | 9/1981 | Taylor | 156/242 |
| 4,292,106 | 9/1981 | Herschdorfer et al. | 156/243 |
| 4,318,762 | 3/1982 | Meyer | 156/180 |
| 4,335,182 | 6/1982 | Brand et al. | 428/319.3 |
| 4,377,549 | 3/1983 | Taig | 264/320 |
| 4,378,725 | 4/1983 | Hospers et al. | 156/180 |
| 4,394,338 | 7/1983 | Fuwa | 264/135 |
| 4,395,459 | 7/1983 | Herschdorfer | 428/391 |
| 4,410,478 | 10/1983 | Lindenmayer et al. | 264/248 |
| 4,415,729 | 11/1983 | Scoggins et al. | 528/388 |
| 4,445,957 | 5/1984 | Harvey | 156/180 |
| 4,481,056 | 11/1984 | Kuhl | 156/180 |
| 4,495,018 | 1/1985 | Vohrer | 156/187 |
| 4,495,021 | 1/1985 | Goldsworthy | 156/425 |
| 4,501,715 | 2/1985 | Barfield et al. | 264/248 |
| 4,539,249 | 9/1985 | Curzio | 264/103 |
| 4,539,785 | 9/1985 | Overbo | 52/309 |
| 4,549,920 | 10/1985 | Cogswell et al. | 156/181 |
| 4,565,595 | 6/1986 | Whitener | 156/156 |
| 4,589,801 | 5/1986 | Salama | 405/224 |

FOREIGN PATENT DOCUMENTS 125472 11/1984 European Pat. Off. .

OTHER PUBLICATIONS

Plastic Engineering Handbook, 4th Ed., Van Nostrand Reinhold Co., 1977, p. 196.
Chemical Week, Apr. 16, 1986, "Composites: On the Leading Edge..." Paul Kemezis pp. 6–8.
Modern Plastics Encyclopedia, 1985–1986, p. 69 Polyphenylene Sulfide, by P. J. Boeke.
Modern Plastics Encyclopedia 1988 pp. 278–284 (3 pages).

Primary Examiner—Jay H. Woo
Assistant Examiner—C. Scott Bushey
Attorney, Agent, or Firm—Williams, Phillips & Umphlett

[57] ABSTRACT

An apparatus and process are provided for continuously consolidating and shaping a plurality of continuous prepreg structures into a unitary formed product structure. Each prepreg structure comprises a solidified thermoplastic resin matrix containing long reinforcing fibers. In operation, the respective prepregs of the plurality are continuously placed into interfacial contact with one another along their lengths, and passed through a heated die zone wherein consolidation and shaping are achieved to produce a desired unitary formed structure. The unitary formed product is then cooled.

22 Claims, 2 Drawing Sheets

PULTRUSION PROCESS AND APPARATUS

BACKGROUND OF THE INVENTION

In one aspect, the invention relates to an apparatus for conducting a pultrusion process. In another aspect, the invention relates to a pultrusion process. In a still further aspect, the invention relates to a product resulting from a pultrusion process.

The production of pultruded products from thermoset resin such as polyester resin is well known. In this process, a glass fiber roving is pulled from a creel, passed through a liquid polyester resin bath for impregnation of the roving with the resin and subjected to final shaping and curing in a heated die. A puller is located in the process after the curing die for causing the roving to be forwarded through the processing system. The roving can be formed from other types of fibers such as carbon fiber or aramid fiber and other liquid thermoset resin such as vinyl ester resin or epoxy resin can be used as the matrix material if desired.

Pultrusion processes employing thermoplastic resins for the matrix material are not nearly so well known. Where a liquid bath of molten thermoplastic resin is used, the high viscosity of the molten resin and poor wetout of the roving causes processing problems. Also, many thermoplastic resins will degrade when held in the molten state, usually by undergoing crosslinking reactions, becoming of even higher molecular weight and higher viscosity. It is thus difficult to provide a uniform product from a pultrusion process employing a molten bath of liquid thermoplastic resin. A pultrusion process capable of providing a uniform thermoplastic product would be very desirable.

Pultruded articles are generally characterized by parallel fibers aligned parallel to the longitudinal axis of the article. Such articles are highly anisotropic where all of the reinforcing fibers are parallel to the article's longitudinal axis. For many applications, pultruded articles are not entirely suitable because of inadequate isotropic properties. A pultrusion device and process for providing a pultruded product having greater isotropic properties would thus be very desirable.

For many applications, a high degree of surface smoothness in the pultruded product is required. Also, because of the tendency of the reinforcing fibers to wick liquids into the article weakening it, providing a smooth and/or resin enriched surface to seal off the fibers could be desirable for certain applications.

When utilizing slurry impregnation of filament rovings with thermoplastic particles it is increasingly difficult to obtain good fiber wet out and low void content as the pultruded article becomes increasingly larger in cross section. A process for making large pultruded articles such as rods, bars and I-beams from slurry impregnated rovings with the resulting article having good fiber wet out and low voids would be very desirable.

OBJECTS OF THE INVENTION

An object of one embodiment of the invention is to provide a pultrusion apparatus and process which produces a pultruded article of improved isotropic properties.

In another embodiment of the invention, it is an object to provide an apparatus and process for producing a pultruded article of a relatively large cross-sectional area which is characterized by a low void content and good fiber wet out.

In another embodiment of this invention, it is an object of the invention to provide a pultrusion apparatus and process which produces a pultruded article having improved surface smoothness.

It is yet another object of this invention to satisfy the above objectives with use of a thermoplastic resin.

SUMMARY OF THE INVENTION

In one embodiment of the invention, an apparatus is characterized as including a first means, a second means, and a third means. The first means is for providing a first material comprising a prepreg of fiber-reinforced thermoplastic. The first means can be positioned at the end of a line for producing the prepreg from thermoplastic resin and fiber or it can be adapted to receive a prepreg of fiber-reinforced thermoplastic from storage, for example. The second means is for bringing together with the first material a second material in such a manner as to form a consolidated product. The second means can take many forms, depending on the desired result. For example, where resin enriched surface is desired on the prepreg, the second means can take the form of a fluidized bed of the second material, or an extruder for extruding the second material onto the prepreg. In another embodiment, the second means can be a film-layer adapted for laying a film or sheet of the second material generally longitudinally onto the prepreg. In another embodiment, the second means can constitute a winder, to wrap or wind a film or ribbon of the second material on the prepreg in a spiraling manner. Where it is desired to substantially increase the cross-sectional area of the prepreg, the second means may include a compactor for compacting a second prepreg with the previously provided prepreg from the first means. Where each of the first material and the second material comprise prepregs which have been preshaped to fit together the compacter will produce maximum packing resulting in low voids in the final product. In another embodiment, the second means lays reinforcing filaments on the outer surface of the prepreg, optionally in filament wound or braided form. The third means of the apparatus is preferably for pulling the first material through the second means for bringing the first material together with the second material and forming a consolidated product. Suitable devices are known and can be formed from driven wheels or moving jaws, for example.

In one preferred embodiment of the invention, shaping apparatus is provided between the second means and the third means to thermoform, or rolltrude, or pullform, or rollform the consolidated product and form a shaped product. The shaping apparatus receives the consolidated layup from the second means and by application of pressure provides it with the desired profile or cross-sectional configuration. If further desired, a cooled die can be positioned between the second means and the third means to receive the consolidated product or shaped product and provide a finished product having a smooth surface.

In another embodiment of the invention, there is provided a pultrusion process. As a first step in the process, there is the provision of at least one elongated thermoplastic structure having a longitudinal axis and comprising a long fiber reinforcement in a continuous thermoplastic matrix. There is brought together with this structure at least one article to be brought together with the continuous thermoplastic matrix. The structure and the article are then passed through a consolidation means to consolidate the structure and the article and form a consolidated structure. The article to be brought together with the elongated thermoplastic structure can be selected from a wide variety of materials depending upon the desired end product. For example, the article can be selected from the group consisting of a thermoplastic powder, a thermoplastic sheet, a thermoplastic tube, a thermoplastic rod, a thermoplastic strip, a tow of parallel reinforcing fibers, a reinforcing fiber fabric or mat, a braided tube of reinforcing fiber fabric, and a fibrous reinforcement which carries a dispersion of thermoplastic powder. In one embodiment of the invention, the article comprises a releasable material such as a release sheet which can later be peeled from the consolidated structure if desired. Generally speaking, the elongated thermoplastic structure in its simplest form will have the form of a rod, tape or slat having a longitudinal axis and containing long fiber reinforcement. The long fiber reinforcement can be parallel to the longitudinal axis of the elongated structure (on-axis reinforcement) or set at an angle to the longitudinal axis of the elongated structure, (off-axis reinforcement). In one embodiment, an elongated thermoplastic structure in the form of a slat containing off-axis reinforcement can be provided by collapsing and pultruding a braided tube. In another embodiment, the elongated structure can be provided by softening and collapsing a filament wound article, in which event the fiber reinforcement can be positioned at near 90° C. to the longitudinal axis of the elongated thermoplastic structure. Where the elongated thermoplastic structure contains off-axis reinforcement positioned at an acute angle with respect to the longitudinal axis of the structure, the structure in one embodiment of the invention is brought together with the article so that the consolidated structure will have an outer layer in which the fibers are parallel to the longitudinal axis of the consolidated structure. Where off-axis reinforcement is desired in the outermost layer, the structure and article(s) are preferably brought together with a release sheet forming the outermost layer in the consolidate for later removal with an off-axis reinforcement layer positioned immediately thereunder. In yet another embodiment of the invention, the at least one article and the at least one elongated structure are provided with complimentary preshapes and are brought together in a manner to approximate the final desired shape prior to being passed through the consolidation means. In a still further embodiment of the invention, the consolidated structure is shaped into a desired profile and optionally cooled in a cooled die to produce an improved surface in the finished end product.

In still another embodiment of the invention, there is provided a pultruded fiber-reinforced thermoplastic article. The article has a longitudinal axis and a first section of continuous parallel reinforcing fibers aligned parallel to the longitudinal axis of the article by pultrusion. A continuous thermoplastic matrix surrounds the fibers. A second section of material is fusion bonded to the continuous thermoplastic matrix alongside the section of containing the continuous parallel reinforcing fibers. The second section of material extends parallel to the longitudinal axis of the article and is selected depending upon the properties that are desired in the finished article. For an improved article surface, the second section can comprise an outer coating of resin or an outer ply of continuous on-axis parallel reinforcing fibers embedded in resin or a release sheet. To fill in a void or groove in a pultruded product, the second section can comprise a strip of resin or fiber-reinforced resin such as veil mat. For improved isotropic properties in the finished article, the second section can be formed from a fabric of reinforcing fibers or a collapsed filament wound structure. The finished article can have any desired cross-sectional configuration. Rods or bars are suitable for many applications. For many structural applications, the finished article will contain at least one elongated plate portion usually joined to at least one other elongated plate portion each along a long side thereof and forming a right angle therewith. It is well within the scope of the invention to provide the finished article with an "L" or "angle" shaped cross section, a "C" or "channel"-shaped cross-section, an "I-beam"-shaped cross-section, a "T"-shaped cross-section, a "Z-beam"-shaped cross-section, especially having right angles in the cross-section (part of an "T-beam"), a "hat"-shaped cross-section (top hat cross-section), or a "wedge" or "arrowhead"-shaped cross-section. A tubular article having a "rectangular"-shaped cross-section can be provided by bringing together a pair of "channel"-shaped articles in a face-to-face orientation. Alternatively, an "I" beam article can be provided by bringing together a pair of "channel"-shaped articles in a back-to-back orientation.

DETAILED DESCRIPTION OF THE INVENTION

Figure 1:
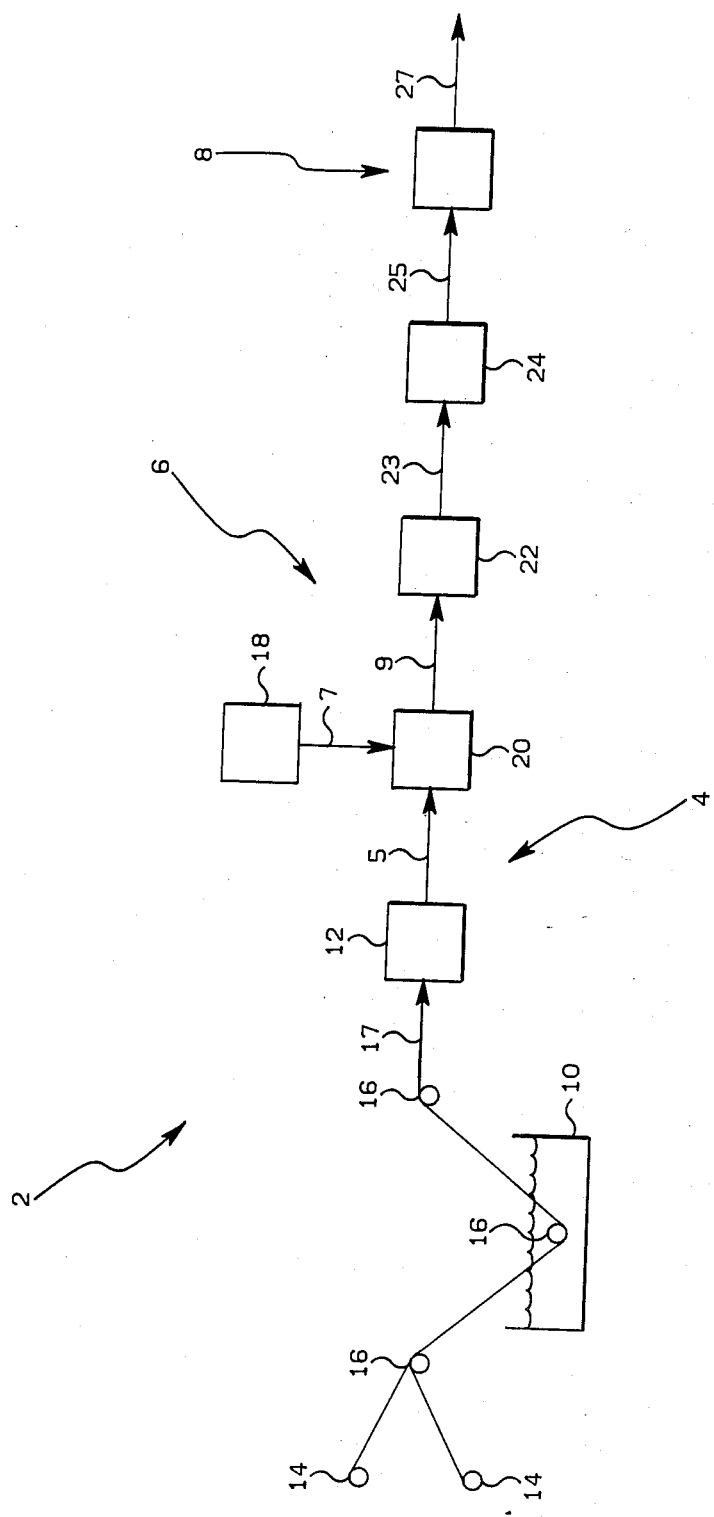
FIG. 1 illustrates schematically certain aspects of the present invention.

The invention broadly relates to the formation of structures from thermoplastic resins and reinforcing fibers. Suitable thermoplastic resins are well-known. For example, polyolefins such as polypropylene can be used. Polyesters, polycarbonates, and polyamids such as Nylon ® can also be used. High performance thermoplastics, the so-called engineering plastics, such as polyether-ether ketone (PEEK) and polyetherimide (such as Ultem ®) polyphenylene diketone (PPDK) and liquid crystal polymers are even more suitable. The preferred thermoplastic resins for use as the matrix material in accordance with the invention are selected from the family of aromatic sulfide polymers from the poly(arylene sulfide) (PAS) family. Poly(arylene sulfide) have the general formula $(AR-X-AR-S)_n$. The AR represents an aromatic unit which may be a mono or polycyclic moiety and X may be selected from at least one or the groups O, S, SO2, CO, OCO, NCHO, etc. The PAS polymers are noted for their excellent chemical resistance, good thermstability, and physical strength. Poly(phenylene sulfide), which consists of a polymer backbone of alternating aromatic rings and divalent sulfur atoms has been used with good results. One type of suitable poly(phenylene sulfide) is a commercial engineering thermoplastic resin that is semi-crystalline in nature with a glass transition temperature of about 85° C. and a crystalline melting point of about 285° C.

The fiber reinforcement suitable for use in the present invention can be selected from a wide variety of materials. The only constraint is that the fiber must not decompose prior to reaching the processing temperature for the resin selected as the matrix material. For poly(arylene sulfide) resins, glass fibers, carbon fibers, and aramid fibers such as Kevlar ® fibers are most preferred. The length of the individual fibers and the form in which the fibers are used depends upon the desired product properties. In the embodiment of the invention where resin is extruded onto an article, fibers, if present, will generally be short, normally about one centimeter or less. Where the fibers are utilized in the form of a mat or fabric, the length of individual fibers will normally be greater than one centimeter. Where the fiber is used in the form of a roving, or a material formed from a roving, such as prepreg tape, or a fabric strip, or a filament wound structure, continuous fibers will normally be present. Where improved transverse properties are desired, there will generally be incorporated into the article a woven prepreg, a continuous or chopped swirl mat prepreg or sheet or other type prepreg with fibers oriented in angles away from the pultrusion direction or, (off-axis reinforcement).

Articles formed in accordance with the invention find utility in many fields. For example, beveled slat-shaped laminates containing both unidirectional fiber, off-axis fiber and/or fabric can be used as blades and for air-foil trailing edges, for example. For such applications, surface finish is highly important. Massive pultruded pieces formed from embodiments of the invention can be used in frames and other structural applications. Large diameter rods formed from sections can be used as sucker rods in wells, for example.

With reference to FIG. 1, an apparatus 2 comprises a first means 4 for providing a first material 5 comprising a prepreg of fiber-reinforced thermoplastic; a second means 6 for bringing together with the first material 5 a second material 7 and forming a consolidate 9 and a third means 8 for pulling the first material 5 through the second means 6 to form the consolidate 9. The degree of consolidation effected by the means 2 can vary depending on the embodiment of the invention being utilized.

A wide variety of prepreg materials 5 can be used in the invention. The means 4 will be selected to produce the desired type of prepreg 5. Where the prepreg 5 has a longitudinal axis and the reinforcing fibers are positioned essentially parallel to the longitudinal axis of the prepreg ("on-axis" reinforcement), the means 4 can comprise a slurry bath 10 containing a suspension of the desired thermoplastic particles, a hot die 12, and at least one supply 14 of fiber reinforcement. Preferably, the supply 14 comprises creels of continuous fiber rovings which are pulled through slurry bath 10 for impregnation with the resin particles to form particle-impregnated rovings 17 followed by passage through the die 12 for fusion of the resin particles into a continuous thermoplastic matrix and molding into the desired cross-sectional profile or pre-shape. The individual fibers in the rovings from supplies 14 are preferably spread apart by passage over rollers 16 to facilitate pick up of resin particles from the slurry bath 10 and, if desired, also drying of the dispersing liquid from the bath prior to introduction into the hot die 12 by a means not shown positioned between the bath 10 and the die 12.

The particle size of the thermoplastic resin in the slurry bath 10 will usually be on the order of the diameter of the individual filaments in the roving. For many applications, the individual particle size will be principally 20 microns or less. For most applications, the prepreg 5 will contain from about 30 to about 80 weight percent of reinforcing filaments, the remainder being the thermoplastic matrix material.

In another embodiment, where the fiber reinforcement in the prepreg 5 is in the form of a fabric or nonwoven mat, the means 4 may be chosen to include a heated platen press to provide a continuous prepreg by fusing together strips of mat or fabric as desired, with one or more films or particle layers of the desired thermoplastic resin. For example, the fabric can be in the form of a woven tube which can be collapsed and melt impregnated with thermoplastic sheets or film in the platen press.

It should further be understood that the first means 4 can simply be a holder or support for a prepreg material 5 from storage which may be precut form or in continuous form if it is thin enough to be stored on a creel or roll.

The second means 6 can take on a variety of forms in the present invention. In one embodiment of the invention, the second means 6 comprises a powder coating means and can carry out a fluidized bed coating or spray coating of the prepreg 5 with the second material. In such case, the second material will generally constitute particles of the thermoplastic resin of a fine size such as 0.010 inches or smaller for example. The prepreg 5 in this embodiment is preferably at a sufficiently high temperature to melt the resin particles as they are brought together with the prepreg or at least at a sufficiently high temperature to promote adherence of the particles to the prepreg. In such case, a source 18 of the second material 5 will generally constitute a source of resin particles.

In another embodiment of the invention, the second means 6 comprises an extruder for the extrusion of a thermoplastic coating on the prepreg 5. In such case, the source 18 of second material will generally contain a thermoplastic resin, usually in pellet form with desired additives, if any, incorporated therein.

In another embodiment of the invention, the means 6 comprises a roving or tape-laying device. The roving or tape can be laid longitudinally on the prepreg, if desired. Where the product surface is to comprise off-axis reinforcement, the tape in one embodiment of the invention preferably comprises a release sheet such as a Teflon ® (polytetrafluroethylene) coated release cloth or strips of thin metal such as copper, tin, aluminum, steel, etc. If desired, an on-axis reinforcement layer can be laid on top of the release sheet to facilitate smooth passage through the die. Alternately, the roving can be wrapped by suitable means such as filament winding or braiding around the prepreg 5. The roving or tape is consolidated with the prepreg by the application of heat and pressure. If desired, additional thermoplastic resin can be added prior to consolidation by fluid bed coating or extrusion coating, for example, to obtain good fiber wet-out.

In yet another embodiment of the invention, the means 6 comprises a feeder or holding or support device for an elongated thermoplastic article. For example, the means 6 can comprise a feeder or holder for a thermoplastic sheet, a thermoplastic tube, a thermoplastic rod, or a thermoplastic strip and the source 18 can comprise a supply of these items. These items may also contain reinforcing fibers in the form of a tow, a fabric, a tape or a braided tube, for example. In such case, the means 6 generally further comprises a compaction device 20 for consolidation of the first material 5 with the second material 7. The required consolidation can be accomplished by drawing the materials 5 and 7 between hot platens or through a heated die, for example, with preheating of the materials carried out if required, such as by IR heating, RF heating, microwave heating, induction heating or di-electric heating.

In one embodiment of the invention, both of the materials 5 and 7 comprise prepregs containing fiber reinforcement. Additional non-reinforced thermoplastic can be fed into the means 6, in the form of a strip, for example, for fill or any groove present in the consolidate. The materials 5 and 7 are brought together in the compaction device 20 and the consolidate 9 is withdrawn and preferably passed to a shaping means 22 for shaping the consolidate by the application of pressure into a desired profile. The means 22 is positioned between the means 6 and the pulling means 8. The means 22 can be a part of the means 6. For example, many materials 5 and 7 can be combined and shaped in a hot die having a converging passage therethrough. If desired, the hot die can have a separate cooling section. In the means 22, the consolidate 9 is thermoformed, rolltruded, rollformed, or pullformed into a shaped structure 23 of the desired cross-sectional configuration.

In one embodiment of the invention, where the first material 5 is in the form of a tape or slat and contains fibers running in other than the direction of pull, i.e., off-axis reinforcement the second material 7 will preferably comprise a release material or contain long fiber reinforcement parallel to the length of the tape and be brought together to parallel the length of the materials. This relationship between the materials 5 and 7 will provide a better surface in the shaped product 23 than where the outer surface of consolidate 9 contains fibers oriented other than in the direction of pull, which have a tendency to bunch up when going through the die. If desired, a roving of continuous fibers carrying a dispersion of thermoplastic powder which can be formed in the same manner can be used as the second material 7 in this embodiment.

One of the most important embodiments of the invention probably resides in the practice of bringing together complementary shapes in the means 6. In the simplest embodiment, small pre-shapes can be combined to form larger ones. For example, a one-half inch diameter solid rod is four times the cross section of a one quarter inch diameter solid rod (0.196 inches squared vs. 0.05 inches squared). Four pultruded ¼ inch diameter glass fiber PPS rods (or carbon fiber PPS rods) can be combined and pultruded through a ½ inch diameter die to form and pultrude the larger ½ inch diameter rod. Another technique for forming ½ inch diameter solid rod utilizes a ¼ inch rod as the first material 5 which is brought together with a first pair of "trough"-shaped prepregs 7 having an arcuate cross-section with an inside curvature of ¼ inch to fit the ¼ inch rod and an outer curvature of ⅜ inches along the inner arcuate surface; and a second pair of "trough"-shaped prepregs of arcuate cross section with inner diameter of curvature being ⅜ inches to closely receive the ⅜ inch outer diameter of curvature presented by the first pair of prepregs, and an outer diameter of curvature of ½ inch. As another example, each of the first material 5 and the second material 7 can be in the form of identical prepregs of "channel"-shaped cross-sectional configuration which are brought together in the consolidation device 20 in a back-to-back configuration to form a consolidate 9 having an "I"-shaped cross-section, suitable for use as in I-beam.

Alternatively, the channel-shaped prepregs can be brought together in a face-to-face configuration to provide a box-shaped cross-section in the article. Of course prepregs of arcuate cross-section can be brought together to form round rubes if desired. Where tubular articles are desired, the die should have a tapered bayonette of the desired cross-section extending into it from the upstream end.

In yet another embodiment of the invention, a cold finishing die is positioned between the shaping means 22 and the pulling means 8 to finish the shaped product into a finished product 25. In this embodiment, the cold finished product 25 is acted upon by the pulling means 8 to pull the material along the processing line. Finished product 27 can be withdrawn from the pulling means 8, cut to any desired length, and stored or used as desired.

In one embodiment, the shaping means 22 comprises a heated forming die which is generally maintained at a temperature in the range of from 10° C. to 100° C. above the melting point of the thermoplastic matrix. The residence time of the material passing through the heating die generally ranges from about 0.5 to about 500 seconds. Line speed is generally in the range of 0.005-10 inches/second, preferably 0.01-1 inches/second. Articles of larger cross-section require longer residence times for good fiber wet-out and consolidation. The forming die has a sufficiently high temperature to soften the thermoplastic matrix and a sufficiently small passage through it to consolidate the consolidated structure 9 into the shaped structure 23. Consolidation need not be complete, since it can be carried out at a later time. Preferably, the shaped structure 23 is cooled at a rate sufficient so that the cross-sectional configuration of the passage through the die is replicated in the finished product 25. In one embodiment of the invention, the shaped structure 23 is cooled in cooling die 24. At high line speeds, the cooling die may be fed a flow of cooling fluid at a rate sufficient to solidify the polymer, but not so high as to cause crumbing, or sticking to the die, or incomplete consolidation unless incomplete consolidation is desired. When both shaping and cooling dies are used, it is preferred that the shaping die be sized for incomplete consolidation and the finishing die sized smaller to cause complete consolidation. The passages through the dies should be tapered. The matrix should be in a softened state when it enters the finishing die.

For best results in using the invention, it is recommended that the feeds to the various processing stations be subjected to sufficient tension to ensure proper fiber alignment in the work station product. Normally, drag from the preceeding work station will be sufficient to accomplish this result.

The product 25 resulting from practice of embodiments of the present invention can be characterized as being pultruded fiber reinforced thermoplastic articles. Each of the articles has a longitudinal axis and a first section of continuous parallel reinforcing fibers aligned parallel to the longitudinal axis of the article by pultrusion. A continuous thermoplastic matrix impregnates and surrounds the fibers. A second section of material, corresponding to that added from the supply 18, is fusion bonded to the continuous thermoplastic matrix alongside the bundle or section of continuous parallel reinforcing fibers. This section of material extends parallel to the longitudinal axis of the article and imparts desirable properties to the article. Where the second section comprises an outer coating of a thermoplastic resin which is of the same type as the thermoplastic matrix, an improved surface appearance results which seals the reinforcing fibers from attack by their environment. A more durable product may thus result where the article surface is enriched in thermoplastic resin. Where the second section comprises an outer ply of continuous parallel reinforcing fibers aligned parallel to the longitudinal axis of the article by pultrusion in a continuous thermoplastic matrix, an improved surface appearance is provided which is especially notable where overlaying a fabric reinforced core such as a core in the form of a slat or wedge which serves as the first section. Where the second section comprises a release material such as a release cloth, a pultruded article can be provided which has an outer ply of off-axis reinforcement simply by removal of the release material.

In certain embodiments of the invention, the second section is formed from a strip extending parallel to the longitudinal axis of the article and containing a thermoplastic resin or fiber reinforced thermoplastic resin. This embodiment of the invention has special utility where articles have been brought together for fusion bonding and there is an imperfect fit, requiring fill such as where several rods are brought together to form a larger one. In other aspects of the invention, it can be desirable that the section of material be in the form of a fabric of fiber reinforced thermoplastic to improve the isotropic properties of the final product.

The articles of the invention can have a wide variety of cross-sectional appearances or profiles. Exemplary of these cross-sectional configurations are "C" or "Channel"-shaped cross-sections, "I"-shaped cross-sections, "Hat"-shaped cross-sections, "wedge"-shaped cross-sections, "Arrowhead"-shaped cross-sections, "Rectangular"-shaped cross-sections,"T"-shaped cross-sections, "J"-shaped cross-sections, "Z"-shaped cross-sections, and "L" or "angle" shaped cross-sections, and tubes. For structural applications, the article will usually contain one or more elongated plates, generally joined to at least one other elongated plate along a long side thereof. In each instance, it is most preferable that the outer ply of the article be characterized as continuous parallel reinforcing fibers aligned parallel to the longitudinal axis of the article by pultrusion in a continuous thermoplastic matrix because of the improved ease of fabrication which results.

EXAMPLE 1

The following example illustrates use of the invention to pultrude ½" diameter carbon fiber rods from four previously pultruded ¼ diameter rods. The ¼" rods were made using 32 tows of Hercules AS-4 12K carbon fiber. These tows were spread by pulling over tension bars. The spread tows were impregnated by then pulling them through a slurry bath as disclosed in U.S. Pat. No. 4,680,224 the disclosure of which is incorporated herein by reference. The polymer was a modified polyphenylene sulfide polymer made as described in the Examples of U.S. Pat. No. 4,415,729, the disclosure of which is incorporated herein by reference, using TCB and sodium acetate. The polymer had a melt flow between 20–54 g/10 min. It had been ground to an average particle size of 10–20 microns. The impregnated tows are then dried from water and formed into a ¼" rod by pulling through a tapered set of dies operating at 375° C., the last die having a final diameter of ¼". The rods were pulled at 15"/min. and contained 57.5–59.4 weight-% fiber. A total of 4 of the ¼" rods formed above are then combined into a ½" diameter rod by pulling a bundle of the four rods through another set of tapered die, the last of which has a final diameter of ½". The dies were operated at 375° C., the rods were pulled at a linespeed of 2"/min. to allow sufficient heat transfer to get the rods molten prior to final forming. The final rod was very smooth, shiny and appeared well consolidated by visual inspection.

EXAMPLE 2

Figure 2:
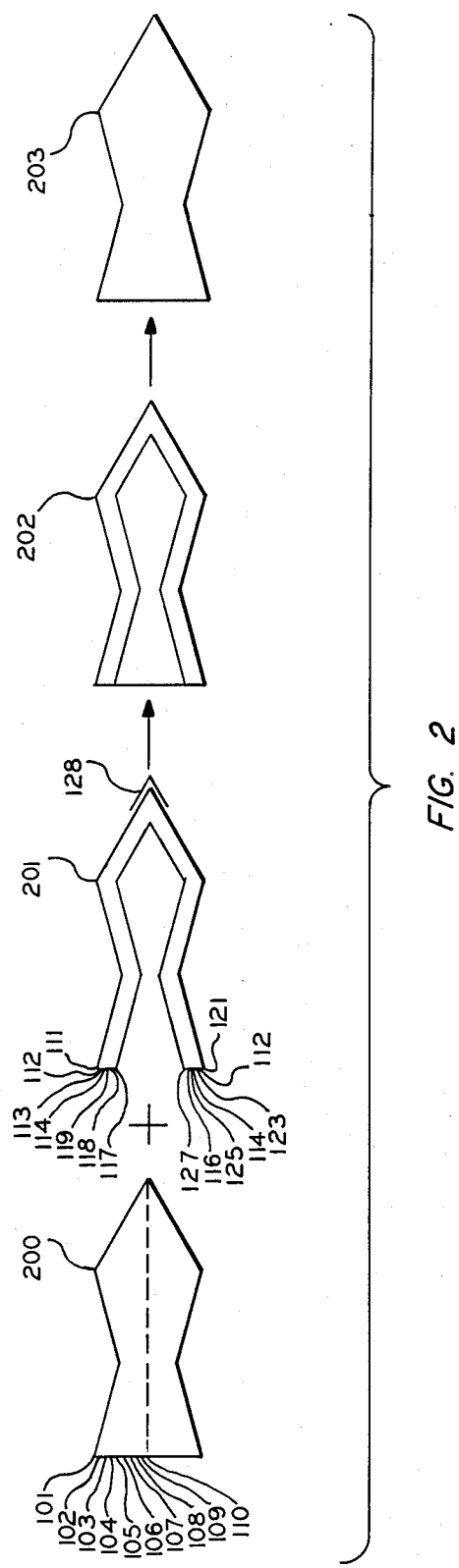
FIG. 2 illustrates schematically one embodiment of a multistep continuous formation process for making an article using the teachings of the present invention.

This example describes formation of a continuous article having an arrowhead cross-section in 3 steps, the first being pultruding a preformed outer shell, the second being pultruding a preformed core and the final being snapping the outer shell over the core and repultruding to give the final consolidated shape. The steps are schematically shown in the FIG. 2.

In the step 1, two pieces of satin weave fabric prepreg 6" (112) and 5¾" (116) wide are folded in half and pulled through a tapered die with a final cross-section being the desired arrowhead shape. A bayonet is used inside the die to form the open shell The dies are operated at 220° C., a linespeed of 7"/min. is used. This preforms the fabric layers without melting them making it possible to separate them. The 6" wide fabric is then sandwiched between 4–3" unidirectional (UD) glass prepreg tapes on top (111, 121) and bottom (113, 123) and an extra 2" wide UD tape (128) is also folded in half and put over the apex of the folded fabric. The other satin weave fabric prepreg (116) was sandwiched between 4–3" wide UD prepreg tapes as shown on top (115, 125) and bottom (117, 127) and a piece of 6" wide veil type glass mat (114) supplied via General Dynamics was folded over the outside of the 5¾" sandwich structure and the 6" sandwich structure was slipped over this. This assembled package was then pultruded through the same die set up described above to preform the initial 2 layers of fabric. The hot dies were run at 315° C. A cooling die was used after the hot dies to cool the material under pressure. It was operated at 100°–123° C. A linespeed of 7" min was used.

The satin weave fabric prepreg is made by combining modified polymer as described in Example 1, with a satin weave glass fabric and compacting the two at a temperature high enough to melt the polymer and afford suitable wet out of the fabric to form the prepreg.

In step 2, the various layers of glass UD tape and veil-like mat (110) supplied from General Dynamics are formed into the inner core. The various layers are all stacked up with the left side (as viewed in the figure) being straight thus affording a tapered stack to the right having a cross-section similar to the finished core. From the 2¼" veil mat (110), outwardly, there were employed, on both sides of the veil mat (110) (only one side shown on FIG. 2), 2 2¼" UD tape (109); 4 2¼" UD tape (108); 1 2¼" Mat (107); 1 2¼" UD tape (106); 5 2" UD tape (105); 2 1¾" UD tape (104); 1 1¾" mat (103); 1 1¾" UD tape (102; and 3 3¼" UD tape (101). The dies used in the final part of step 1 are used without the bayonet included. Inside the cooling die a 0.050 thick skin shaped to the cross-section of the arrowhead is inserted to make up the room which the outer shell will later occupy. The hot dies are run at 375° C. with the cooling die at 200° C. A linespeed of 3"/min. is used to pull the core. A nitrogen bleed is fed into the entrance to the hot dies. Slight tension is applied to the tapered stack prior to entering the hot dies.

In step 3, the outer shell is snapped over the inner core and repultruded through the die set up just used without the 0.050 skin. The hot dies are run at 400° C. and the cooling die 150°-⅜° C. A linespeed of 2"/min. was used with a nitrogen bleed feeding into the entrance of the hot dies. The finished arrowhead shaped article had a smooth surface and little distortion of the fabric in the outer shell layer was visible upon observing a smoothly cut cross-section of the article.

That which is claimed is:

1. A continuous process for consolidating and shaping a plurality of preformed continuous prepreg-type structures into a unitary formed product structure, each such prepreg-type structure comprising long reinforcing fibers in a solidified thermoplastic resin matrix, said process comprising the steps of continuously and sequentially
   (a) positioning the respective members of said plurality of prepreg-type structures together in a predetermined interfacially overlapping relationship relative to one another along their respective lengths,
   (b) passing the resulting so positioned plurality of structures through at least one heated die zone, each such zone being adapted both to heat said plurality of structures to a temperature that is above the fusion bonding temperature for said themoplastic resin matrix and to pressure said plurality of structures selectively whereby said plurality of structures is conformed by said passing into said unitary formed structure having a predetermined consolidated cross-sectional configuration, and
   (c) cooling said so formed structure while retaining the form thereof.

2. A process of claim 1 further comprising tensioning said so positioned said plurality of structures prior to said passing.

3. A process of claim 1 wherein said is carried out by passing said formed structure through a shape retaining, cooled die zone.

4. A process as in claim 3 wherein said cooling is carried out by passing said formed structure through a cooled die having a sufficiently small passage therethrough to confine and to finish said formed structure.

5. A process of claim 1 wherein said plurality of prepreg-type structures includes a first said prepreg-type structure having a longitudinal axis and a second said prepreg-type structure having a longitudinal axis.

6. A process of claim 5 wherein said second prepreg type structure is selected from the group consisting of a thermoplastic rod containing long reinforcing fibers extending parallel to the longitudinal axis, a thermoplastic tape containing long reinforcing fibers extending parallel to the longitudinal axis, a thermoplastic tape containing parallel long reinforcing fibers extending at an acute angle relative to the longitudinal axis, a thermoplastic tape containing parallel long reinforcing fibers extending a right angle relative to the longitudinal axis and a thermoplastic tape containing a woven fabric long fiber reinforcement.

7. A process of claim 6 wherein said first prepreg type structure is selected from the group consisting of a thermoplastic rod containing long reinforcing fibers extending parallel to the longitudinal axis and a thermoplastic tape containing long reinforcing fibers extending parallel to the longitudinal axis.

8. A process of claim 6 wherein said first prepreg type structure comprises a thermoplastic tape containing parallel long reinforcing fibers extending at an angle to the longitudinal axis.

9. A process of claim 5 wherein said second prepreg type structure comprises a tow of parallel reinforcing fibers in said resin matrix and plurality of said second prepreg type structures are so positioned together with said first prepreg type structure about an exterior surface of said first prepreg and so passed.

10. A process of claim 9 wherein a plurality of said second prepreg type structures are braided into the form a tube which is positioned to overlay said first prepreg type structure.

11. A process of claim 9 wherein said first prepreg type structure comprises a fabric of reinforcing fibers in a continuous thermoplastic resin matrix and said plurality of second prepreg type structures are so positioned together with said first prepreg so that the fibers in said plurality of second prepreg type structures are parallel to the longitudinal axis of said first prepreg type structure.

12. A process of claim 5 wherein said second prepreg has said long reinforcing fibers thereof extending parallel to the longitudinal axis thereof, and wherein said long reinforcing fibers of said first prepreg type structure extend parallel to the longitudinal axis thereof.

13. A process of claim 12 wherein said second prepreg type structure and said first prepreg type structure are so positioned together as to approximate the cross sectional configuration of the passage through said at least one heated die zone.

14. A process of claim 13 wherein said second prepreg type structure and said first prepreg type structure each have a cross-sectional configuration which fit together to approximate the cross sectional configuration of the passage through said at least one heated die zone.

15. A process of claim 5 wherein said thermoplastic resin matrix component of said first prepreg type structure and said thermoplastic resin matrix component of said second prepreg type structure each comprise a poly(arylene sulfide) resin and wherein said long reinforcing fibers in said first prepreg type structure are selected from the group consisting of glass fiber, carbon fiber, and aramid fiber.

16. A continuous process for consolidating and shaping first and second preformed elongated prepreg-type structures into a unitary formed product structure,
   each such prepreg-type structure having a longitudinal axis and comprising long reinforcing fibers in a continuous solidified thermoplastic resin matrix, said reinforcing fibers extending parallel to said longitudinal axis,
   said first prepreg-type structure being generally circular in cross-section,
   said second prepreg-type structure being generally flattened in cross-section,
   there being at least one of said first prepreg-type structures and a plurality of said second prepreg type structures,
said process comprising the steps of continuously and sequentially:
   (a) first positioning the respective members of said plurality of said second prepreg type structures together in an interfacially overlapping relationship relative to one another along their respective lengths,
   (b) secondly passing the resulting so positioned plurality of second prepreg type structures through at least one heated die zone, each said die zone being adapted both to heat said plurality of structures to a temperature that is above the fusion bonding temperature for said thermoplastic resin matrix and to pressurize said plurality of structures selectively, whereby said plurality of structures is conformed by said passing into an intermediate structure having an inner arcuate surface and an outer arcuate surface with said inner arcuate surface being dimensioned to closely receive said first prepreg-type structure(s), (c) thirdly positioning said at least one first prepreg-type structure and said second prepreg type structures together in an interfacially adjacent relationship relative to one another along their respective lengths with said first at least one prepreg-type structure being located adjacent said inner arcuate surface, (d) fourthly passing the resulting so positioned first and second prepreg type structures through at least one heated die zone, each such die zone being adapted both to heat said so positioned first and second prepreg type structures so that the temperature is above the fusion bonding temperature for said thermoplastic resin matrices and to pressurize said so positioned first and second prepreg type structures selectively, whereby said first and said second prepreg type structures are conformed by said passing into a unitary formed structure having a predetermined consolidated cross-sectional configuration, and (e) cooling said so formed structure while retaining the form thereof.

17. A continuous process for consolidating and shaping a plurality of preformed elongated prepreg-type structures into a unitary formed product structure, each such prepreg-type structure comprising long reinforcing fibers in a continuous solidified thermoplastic resin matrix, said process comprising the steps of continuously and sequentially:

(a) positioning the respective members of said plurality of prepreg-type structures together in a predetermined interfacially overlapping relationship relative to one another along their respective lengths.

(b) passing the resulting so positioned said plurality of structures through at least one heated die zone, each such die zone being adapted both to heat said plurality of structures to a temperature that is above the fusion bonding temperature for said thermoplastic resin matrices and to pressurize said plurality of structures selectively, said passing being carried out while a release cloth is extended through said heated die zones whereby said plurality of structures is conformed by said passing into a unitary formed structure having a predetermined consolidated cross-sectional configuration with said release cloth comprising the outermost layer of said formed structure, and (c) cooling said so formed structure while retaining the form thereof.

18. Apparatus for continuously consolidating and shaping a plurality of preformed continuous prepreg structures into a unitary formed product structure, each such prepreg structure of said plurality thereof comprising long reinforcing fibers in a continuous solidified thermoplastic resin matrix, said apparatus comprising in combination:

(A) registration means for aligning and positioning said continuous prepreg strip members of said plurality in a predetermined interfacially overlapping relationship relative to one another, (B) die means positioned for receiving said so registered strip member plurality and for consolidating and shaping under pressure said so registered strip member plurality into a unitary formed product structure having predetermined consolidated cross-sectional configuration, (C) heating means associated with said die means for heating said registered strip member plurality above the fusion bonding temperature of said thermoplastic resin matrices, (D) cooling means for said unitary formed product structure which is positioned downstream from said die means, and (E) pulling means positioned downstream from said cooling means for continuously moving and passing said so registered strip member plurality from said registration means successively through said heating and die means and said cooling means.

19. The apparatus of claim 18 wherein (A) said die means comprises a plurality of separate dies, all said dies being located in successive relationship to one another, (B) said heating means comprises a plurality of separate heaters, each one thereof being associated with a different one of said separate dies, (C) the interrelationship between said die means and said heating means being such that the combination thereof functions to progressively transform said so registered strip member plurality into a unitary formed product structure having a predetermined consolidated cross-sectional configuration, 20. An apparatus of claim 19 wherein:

a first one of said plurality of dies and its associated heater serve to heat and preliminarily consolidate said so registered strip member plurality, and at least one other of said plurality of dies and its associated said heater serve to shape said consolidated plurality.

21. An apparatus of claim 18 which additionally includes:

(A) supply means for individual ones of said preformed continuous prepreg structures of said plurality thereof, and (B) transfer means for moving each one of such prepreg structures from its respective said supply means to said registration means.

22. An apparatus of claim 18 wherein said cooling means comprises:

(A) shape retaining die means for receiving and passing the heated, consolidated, and shaped unitary product structure issuing from the combination of said die means and said heating means, and (B) refrigeration means associated with said shape retaining die means for cooling said unitary product structure below the softening temperature of said thermoplastic resin matrix.

* * * * *

UNITED STATES PATENT AND TRADEMARK OFFICE
CERTIFICATE OF CORRECTION

PATENT NO. : 4,883,552

DATED : November 28, 1989

INVENTOR(S) : James E. O'Connor et al

It is certified that error appears in the above-identified patent and that said Letters Patent is hereby corrected as shown below:

Column 11, line 36, after "said", please insert ---cooling---.

Signed and Sealed this

Eighteenth Day of December, 1990

Attest:

HARRY F. MANBECK, JR.

Attesting Officer

Commissioner of Patents and Trademarks